July 7, 1931. J. L. COOLE 1,813,026
FLOOR WASHING MACHINE
Filed May 18, 1929 3 Sheets-Sheet 1
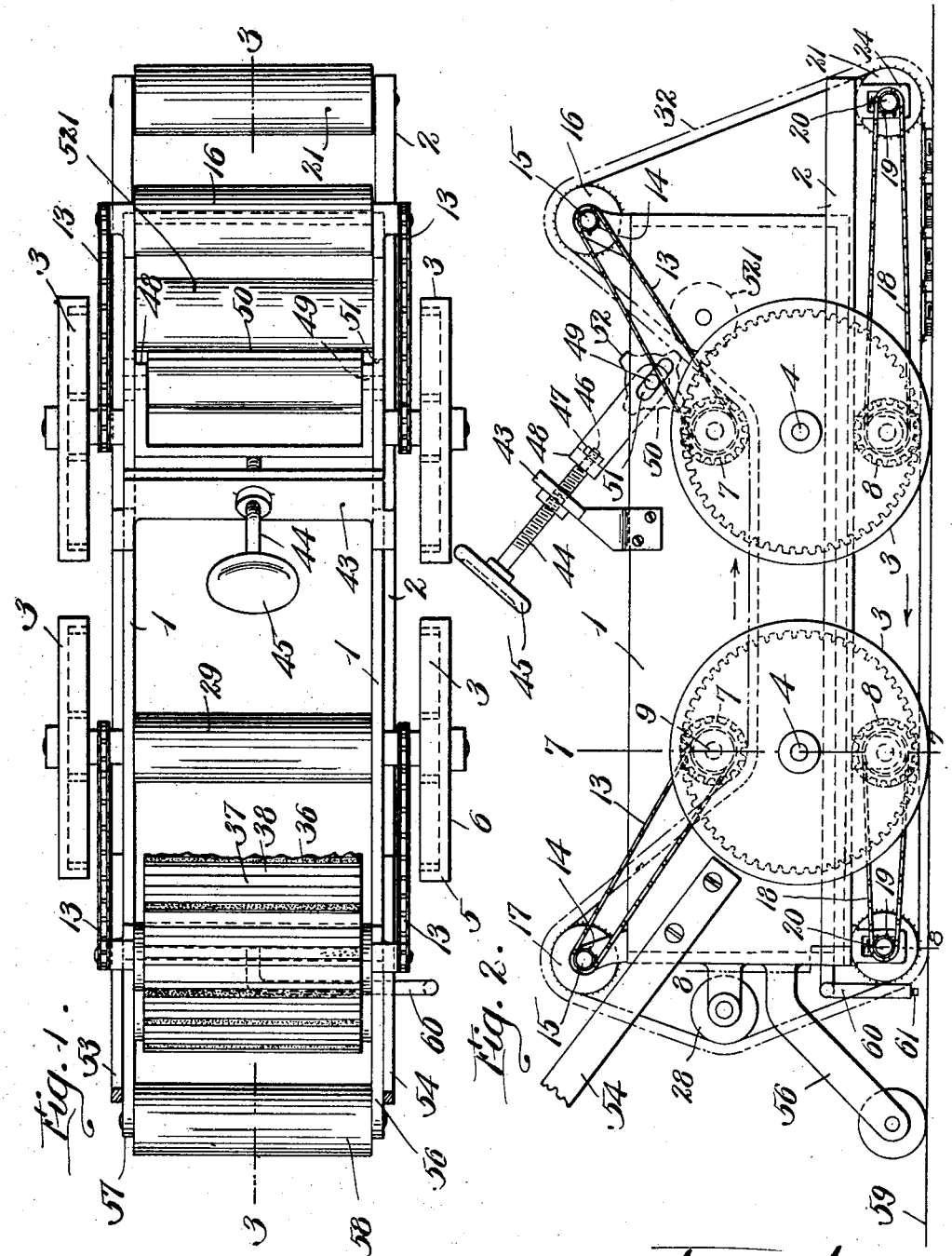
Inventor:
John L. Coole
by George Rockwell
atty.

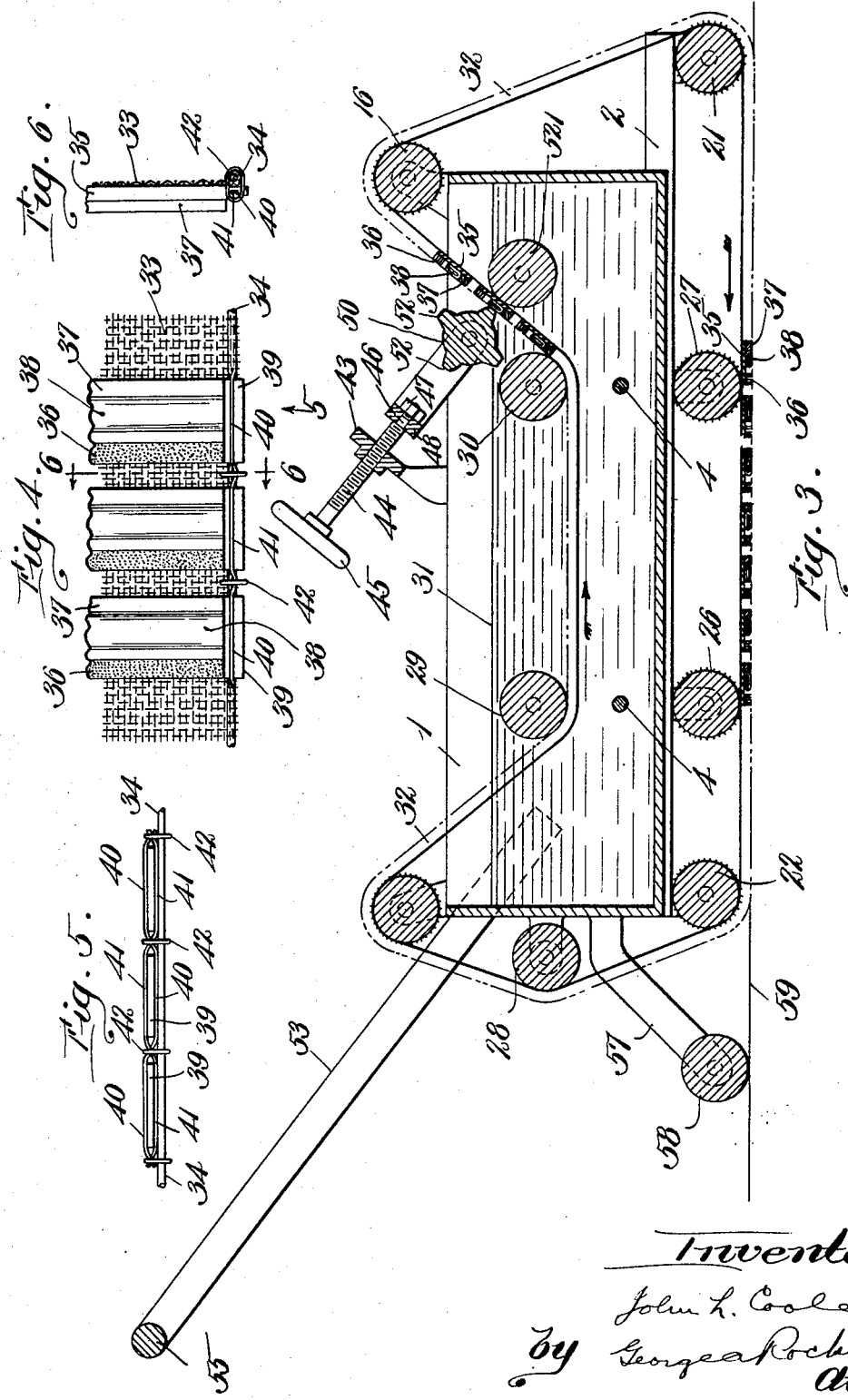

July 7, 1931. J. L. COOLE 1,813,026
FLOOR WASHING MACHINE
Filed May 18, 1929 3 Sheets-Sheet 3

Inventor:
John L. Coole
by George A. Rockwell
Atty.

Patented July 7, 1931

1,813,026

UNITED STATES PATENT OFFICE

JOHN L. COOLE, OF BOSTON, MASSACHUSETTS

FLOOR WASHING MACHINE

Application filed May 18, 1929. Serial No. 364,120.

The principal object of my invention is to provide a machine for scrubbing and drying floors which will be highly efficient in operation and economical from the standpoint of manufacture.

A feature of my invention is a belt provided with a plurality of floor-engaging sets, each set comprising bristles and absorbent material and material in the nature of rubber.

Another feature is the means for connecting said sets to the belt.

Another feature is the provision of floor-engaging disk wheels, preferably provided with internal gear teeth.

Another feature is mechanism for drying the belt, this mechanism being preferably adjustable.

Other features will be described below.

In the drawings

Figure 1 is a plan of a machine embodying my invention;

Figure 2 is a side elevation of the same;

Figure 3 is a longitudinal section thereof on line 3—3 of Figure 1;

Figure 4 is a bottom plan view of a portion of the belt;

Figure 5 is an edge view of the portion shown in Figure 4;

Figure 6 is a section on line 6—6 of Figure 4;

Figures 7, 10:
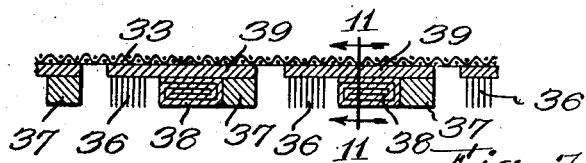
Figure 7 is a section on line 7—7 of Figure 2.
Figure 10 is an enlarged detailed section of two sets of cleaning members.
Figure 11:
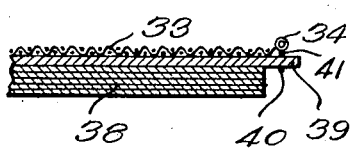
Figure 11 is a section on line 11—11 of Figure 10.
Figure 8:
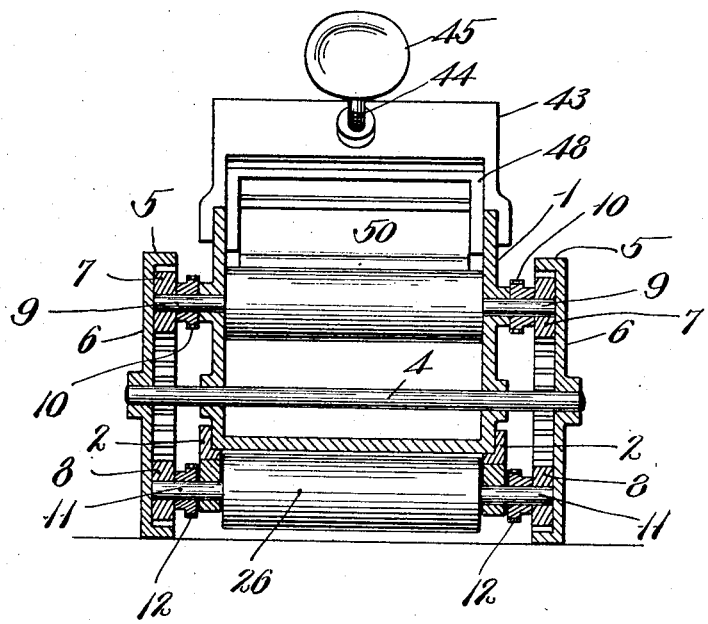
Figure 8 is a section on line 8—8 of Figure 2.
Figure 9:
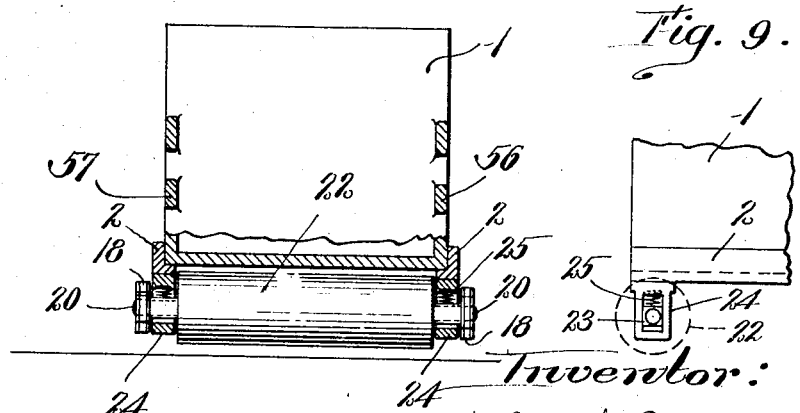
Figure 9 is a fragmentary view of the corner of the tank showing one of the spring bearings.

Tank 1 for carrying soapy water or other cleanser is suitably fixed on chassis 2 which extends well forward of the tank. The chassis is mounted on wheels 3 by means of shafts 4, each wheel having a broad periphery 5 and integral therewith an outer wall or disk 6, the latter having a perforated boss for shaft 4. Each wheel is internally toothed to engage two gears 7 and 8. Each gear 7 is fixed to a shaft 9 to which are fixed sprockets 10, shaft 9 being mounted on the tank. Each gear 8 is fixed to a shaft 11 to which are fixed sprockets 12, shaft 11 being mounted on the chassis. The upper sprockets 10 operate chains 13 which, in turn, operate small sprockets 14 fixed to shafts 15 and to these shafts are fixed rollers 16 and 17. The lower sprockets 12 operate chains 18 which, in turn, operate small sprockets 19 fixed to shafts 20 and to these shafts are fixed rollers 21 and 22. The shafts 15 are mounted on suitable brackets at the top corners of the tank while the shafts 20 rotate in blocks 23 slidably mounted in brackets 24 fixed to the chassis. These blocks are normally pressed down by springs 25 and thus take care of inequalities in the floor.

I preferably provide rolls 26 and 27, each fixed to its shaft 11, and they act to hold the belt, hereinafter described, down against the floor. I provide also an idler roll 28 to guide the belt out of contact with the tank. Guide rolls 29 and 30 are preferably loose on shafts 9 and are provided to guide the belt beneath the surface of the liquid 31 and to provide enough pressure to scrape off dirt. The rolls may be made of any suitable material but I prefer that the rolls 16, 17, 21 and 22 be of wood provided with protuberances as shown to engage and drive the belt hereinafter described.

The belt or carrier 32 for the liquid comprises an endless backing 33 of square mesh wire having each edge selvaged and embracing a reenforcing wire cord 34. This belt is continuous and is driven by its engagement with the protuberances on the rolls 16, 17, 21 and 22. A plurality of sets of cleaning members are carried along by the belt by means which are described below. Each set comprises a rubber base 35 in the forward portion of which are set bristles 36. At the rear end of the base 35 a rubber portion or squeegee 37 is suitably affixed and close to portion 37, but spaced from the bristles 36 to allow play of the latter is a flattened roll of absorbent material 38, such as absorbent cotton, glued to the base 35. The material 38 is close to portion 37 and flush with it to squeeze out the water. The base 35 is extended transversely at each end, one extension being shown at 39 and two wires 40 and 41 are laced along the extensions 39 of the sets so as to connect the sets to each other, the sets being preferably spaced about a quarter of an inch from each other. At each crossing of the wires I provide rings 42, each ring encircling the two wires and the cord 34 and passing through the wire material 33. In this way the cleaning sets are carried, or driven, along by the backing material 33.

Suitably mounted at the top of the tank is a cross-bar 43 internally threaded to engage threaded member 44 which has operating head 45 fixed to one end, the other end having an extension 46 of smaller diameter to which is applied a nut 47. Between the nut and the shoulder of member 44 is mounted a yoke 48, the arms of which form bearings for shaft 49 to which is rigidly fixed spider 50, the shaft being extended at each end beyond the arms of the yoke so as to enter guide slots 51 in the side walls of the tank. The spider 50 has four teeth 52, each engaging in turn the folded absorbent portions 38 of the sets to squeeze out undesired liquid, the amount of squeezing depending on the position of the spider which may be adjusted by rotation of member 44, which rotation will raise or lower the yoke 48, the extension 46 being free to turn in the transverse portion of the yoke, the teeth of the spider acting in opposition to roll 521.

Arms 53 and 54 are suitably connected to the tank and are connected by cross-bar or handle 55. Suitably mounted on brackets 56 and 57 is roller 58 and when it is desired to move the device about without having the cleaning sets in contact with the floor 59 the device may be swung upward at its forward end on the roller 58 as a pivot by means of handle 55.

Pipe 60 leads from the bottom of the tank at the rear centre and is bent at a right angle and then downward and extends well to one side of the tank so as to form a convenient drain, the pipe being normally closed by plug 61, and conducting the material from the tank out of the way of the belt and to a scupper hole, for example.

In use my device is wheeled along the floor, the wheels operating the belt which passes through, and takes up some of, the liquid, the spider and member 521 cooperating to remove undesired liquid from the absorbent members 38, the teeth of the spider being so located as to engage the members 38 as the latter advance. Pressure of the spider may be adjusted by rotation of head 45. The belt is first driven over rolls 16 and 21, the latter being located well forward to reach under a counter or to any relatively inaccessible place. As the cleaning sets engage the floor the bristles loosen up the dirt and then the absorbent material takes up water and then the squeegee thoroughly dries the floor.

When it is desired to move the machine about without having the cleaning elements in contact with the floor, the machine is tilted upward at its forward end by means of the handle 55, the machine tilting on the roller 58 which extends across the machine.

What I claim is:

1. A device of the character described comprising a belt; a plurality of cleaning sets extending across, and having portions extending beyond, said belt; laced members connecting said portions to each other; means to connect said members to said belt; and means to drive said belt.

2. A device of the character described comprising a belt of wire mesh; a plurality of cleaning sets extending across, and having portions extending beyond, said belt; laced wires connecting said portions to each other; wire loops connecting said laced wires to said belt; and means to drive said belt.

3. A device of the character described comprising a belt having a plurality of cleaning sets, each set comprising bristles, absorbent material and a squeegee arranged in line longitudinally of the device, the absorbent material being between the bristles and the squeegee and the bristles, absorbent material and squeegee being in adjacency to each other.

4. A device of the character described comprising a belt; members of absorbent material spaced apart and carried by the belt at one side of the latter; a spider having teeth spaced apart substantially in correspondence with the spacing of said members, each tooth engaging in turn one of said members to remove water therefrom; a member at the opposite side of the belt and cooperating with the spider in said removal; means to adjust the spider; and means to operate the belt.

JOHN L. COOLE.